March 21, 1961 W. B. SANDER 2,976,430

FUNCTION GENERATOR CIRCUITS

Filed April 20, 1959 2 Sheets-Sheet 1

INVENTOR
WENDELL B. SANDER

BY Lester S. Hecht

ATTORNEY

FUNCTION GENERATOR CIRCUITS

Filed April 20, 1959 2 Sheets-Sheet 2

INVENTOR
WENDELL B. SANDER

BY

ATTORNEY 2,976,430
Patented Mar. 21, 1961

2,976,430

FUNCTION GENERATOR CIRCUITS

Wendell B. Sander, Los Angeles County, Calif., assignor to Tasker Instruments Corporation, Hollywood, Calif.

Filed Apr. 20, 1959, Ser. No. 807,608
10 Claims. (Cl. 307—88.5)

This invention relates to function generator circuits and, more particularly, to circuits for translating an input signal into a single output signal or a plurality of output signals where each output signal is related to the input signal in accordance with a predetermined function specified for a predetermined amplitude segment or portion of the input signal. In further particular, the invention is concerned with quantizing function generators which employ diode or other unilateral devices in order to make it possible to obtain sharply changing output signal wave forms.

Function generating circuits of the general type contemplated by the present invention have found frequent application in the prior art. Typical situations are found in the so-called pulse code modulation circuits such as are described in the following U.S. patents: No. 2,733,410 by W. M. Goodall; No. 2,773,980 by B. M. Oliver; and No. 2,773,981, by W. M. Goodall. In each of these patents arrangement is made for translating an input signal into an output signal which is related thereto in accordance with a predetermined non-linear function. In the particular application of the Goodall patents the input signal is translated into a step-function output signal in accordance with the predetermined binary-code translation. These systems then are used for the transmission of voice modulation as digital output signals.

The technique employed by Goodall in the above-mentioned patents may be referred to as a single-output quantizing technique. Where a quantizing circuit is employed as in the Goodall patents, accuracy of translation from the input signal to the output signal is not critical beyond the amplitude variation of the least significant digit of the code. That is, the important function of the quantizing operation is simply to permit the translation of the input signal into the code. It is not important in this application to preserve a highly accurate representation of the input signal amplitude beyond the code translation. In other words, if a five binary digit code translation is suitable for the purpose of the transmission then the accuracy of translation from input to output is only one part in thirty-two.

The fact that inaccuracies of this magnitude are permitted in the Goodall systems is evident in examination of the actual arrangement which is employed such as is shown, for example, in Fig. 2 of Patent No. 2,733,410. In this system, the output signal derived across tube 22 of Fig. 2 of the patent is subject to drift variations inherent in the impedance variation of the tube as well as the variation in the voltage drop across the various diode networks referenced as 31, 32 and 33 in Fig. 2 of the patent. An examination of these patents, therefore, makes it evident that the prior art technique shown therein—which is typical of that known prior to the present invention—is not suitable where a highly precise translation of an input signal into a series of non-linear output functions or to linear functions specified in predetermined portions of the amplitude range of an input signal is required. Furthermore, the conventional technique is not adapted to provide a plurality of separate output functions through a single network, and requiring only a single amplifier.

The present invention, accordingly, has been developed in order to minimize the undesirable effects of drift in circuit components such as diodes and vacuum tubes and, at the same time, to make it possible to produce any number of independently varying output signals each of which is specified as a different function of the input signal.

According to the basic concept of the present invention the diode or unilateral element networks which are to specify the particular portions or segments of the input signal to be translated are interposed internally in a feed-back network which includes a high-gain amplifier. The input signal to be translated is then applied through an input impedance to the high-gain amplifier, and the output signal produced by the diode or other unilateral element network is fed back through a feedback impedance to the input circuit of the high-gain amplifier, the output circuit of which is coupled to the input terminal of the diode network. In the case where a plurality of different output signals are to be derived, each of a plurality of diode circuits has its output terminal coupled through a respective feedback impedance to the input circuit of the high-gain amplifier, and an output circuit is associated with each of the diode circuits to provide the desired translation from a predetermined portion of the input signal to the output signal.

In one mode of operation the invention may be employed with two diodes having their anodes connected through a common impedance to a source of positive potential. In this case, one of the diodes has its cathode coupled to the output circuit of the high-gain amplifier, which is also an inverter, and the other diode has its cathode coupled through a feedback resistor to the input circuit of the amplifier. The input signal I to be translated is applied to an input resistor. With this arrangement the circuit has three possible conditions of operation as follows:

(1) When input signal I is below zero and below a predetermined level $I_C$, the output signal $E_I$ of the amplifier is greater than the output signal $E_O$ of the diode network. This results in the diode $D_1$ which is coupled to the amplifier output circuit being cut off since it is back biased and the diode $D_2$ coupled to feedback impedance is caused to conduct. Thus output signal $E_O$ is established as the voltage division between the load impedance, for the diode network, and the feedback impedance.

(2) The second condition occurs when input signal I is greater than signal $I_C$ but is still less than zero. In this case diodes $D_1$ and $D_2$ are forward biased and the diode network functions to derive a direct-current connection between the output of the high-gain amplifier and the feedback impedance. During this condition, signal $E_O$ is directly related to input signal I as a function only of the input impedance and the feedback impedance and is not affected by the diodes in the diode network.

(3) This condition occurs when the input signal is above zero which causes the inverting high-gain amplifier to produce a signal below zero which causes diode $D_1$ to conduct and bring the voltage at its anode to below ground to cut off diode $D_2$. In this condition, output signal $E_O$ is at a virtual ground.

One feature of this specific arrangement is that the transition point between any one condition to another can be quite accurately specified by the voltages and impedances selected for the circuit and are only slightly affected by the operating characteristic of diode $D_2$. It will be shown, further, that the use of a high gain amplifier substantially reduces the effect of diode $D_1$ in determining the level of output signal $E_O$. Furthermore, the use of a high-gain amplifier in the feedback loop function of the circuit makes it possible to achieve very sharp transition points which may be differentiated and used, as will be explained in further detail below, to designate the interval of occurrence of a particular condition, or to designate a count of a number of intervals. The specific circuit described above may be modified by using a negative voltage source instead of a positive source, with appropriate reversing of the diodes. This basic type of circuit may be duplicated to provide a large number of output signals $E_O$-1 . . . $E_O$-N which are fed back through respective feedback impedances to the input circuit of the high-gain amplifier.

It will be shown in the detailed discussion which follows that the invention is very well adapted for use in a route coordinate generator such as is required for the system of copending patent application entitled Air Traffic Control System by John I. Daspit et al., filed July 3, 1959, Serial No. 824,843. The function of the coordinate signal generator circuit is to translate a distance-to-go signal, referred to as D*g* in the copending application, into rectangular coordinate signals X and Y. The problem is particularly complicated since signal D*g* represents the measurement of a distance along a complex route including a plurality of legs at different angles. That is, the path measured in D*g* is not linear throughout, although the legs may be linear. It is necessary then to translate input signal D*g* into segmentized functions each of which is translated into leg X and Y coordinate signals.

The invention may be employed to provide a plurality of separately operating segmentized function generators each of which provides the desired transition from a particular leg along the route of an aircraft. The output signals derived thereby may be combined to provide total coordinate signals X and Y. The feedback operation of the invention specifies that the sum total of the signals derived through respective diode networks is equal to D*g* which then stabilizes the system to avoid the errors which would be introduced by the diode network.

Accordingly it is an object of the present invention to provide an improved function generator circuit wherein inaccuracies due to the changing characteristics of elements such as diodes are substantially eliminated.

Another object is to provide a simple and effective circuit for translating an input signal into a single output signal or a plurality of output signals where each output signal is specified as a predetermined function of a portion or segment of the input signal.

A further object is to provide a device for translating an input signal into an output signal which is a non-linear function of the input signal, the output signal having sharp transition points at predetermined levels which are substantially insensitive to operating characteristic changes of circuit elements.

Still another object of the invention is to provide an improved non-linear function generator utilizing one diode network, or a plurality of diode networks, wherein changes in the diode characteristics do not materially affect the operation of the generator.

A specific object of the invention is to provide a non-linear function generator which is adapted to translate an input signal into a plurality of separate output signals each of which is individually related to the input signal according to its own respective translation function.

Another specific object of the invention is to provide an improved route coordinate signal generator wherein a single operational amplifier is employed to permit the translation of an input signal representing distance-to-go into a plurality of output signals each of which corresponds to a coordinate point along a particular segment of the route.

The novel features which are believed to be characteristic of the invention, both as to its organization and method of operation, together with further objects and advantages thereof will be better understood from the following description considered in connection with the accompanying drawings. It is to be expressly understood, however, that the drawings are for the purposes of illustration and description only and are not intended as a definition of the limits of the invention.

Figures 1, 2, 2B:
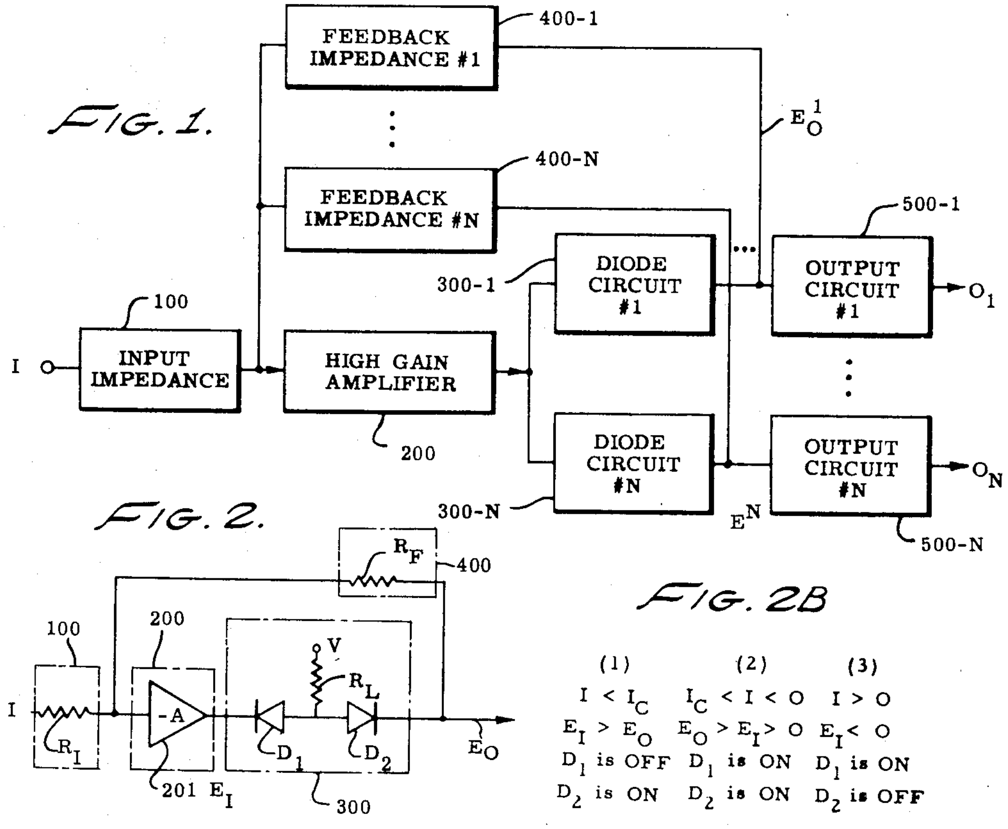
Fig. 1 is a block diagram illustrating the general form of a typical embodiment of the invention.
Fig. 2 is a specific arrangement of a part of the embodiment of Fig. 1.
Fig. 2B is a chart depicting the three conditions of operation of the arrangement of Fig. 2A.

Referring now to Fig. 1 it will be noted that an input signal I is applied to an input impedance 100 which has its output end coupled to the input circuit of a high-gain amplifier 200. The output circuit of amplifier 200 is coupled to the inputs of diode circuits 300-1 . . . 300-N. The output signal produced by each of circuits 300-1 . . . 300-N is applied to one end of a respective one of feedback impedances 400-1 . . . 400-N. The outputs of diode circuits 300-1 . . . 300-N are also applied to output circuits 500-1 . . . 500-N producing signals $O_1$ . . . $O_N$, respectively.

In its general operation, the arrangement of Fig. 1 first translates input signal I into output signals $E_O$-1 . . . $E_O$-N. These signals have constant levels for certain conditions of the input signal as is discussed more fully below and under other conditions follow the input signal. Output signals $O_1$ . . . $O_N$ are then related to signals $E_O$-1 . . . $E_O$-N according to respective translation functions. In a specific case, the desired translation function may be obtained through the use of a potentiometer set to produce an output signal O which is a fixed function of diode circuit signal $E_O$.

Figure 3A:
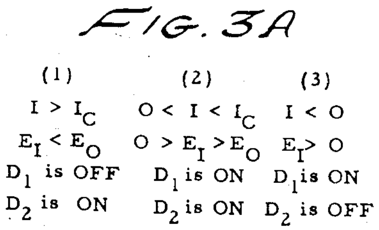
Fig. 3A is a chart depicting the three conditions of operation of the arrangement of Fig. 3.
Figure 3:
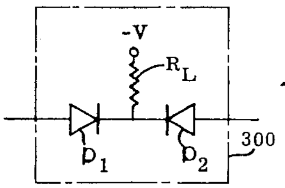
Fig. 3 is a schematic diagram illustrating a variation in circuit 300 of the embodiment of Fig. 1.

While many types of specific circuit arrangements are suitable for use in the general embodiment of Fig. 1 the arrangements of Figs. 2 and 3 will be considered to be sufficiently representative of a suitable diode structure for practicing the invention and accordingly other variations in the diode networks will not be shown.

Referring now to Fig. 2 it is noted that input impedance 100 of Fig. 1 is provided by resistor $R_I$, high-gain amplifier 200 is provided by amplifier circuit 201 which is designated internally with the symbol —A to indicate that it is an inverting amplifier. Diode circuit 300 is shown to include first and second diodes designated respectively as $D_1$ and $D_2$ having their anodes connected to one end of a load resistor $R_L$ the other end of which receives a suitable bias voltage referenced as V. Diode $D_1$ has its cathode connected to the output circuit of amplifier 201 and diode $D_2$ has its cathode connected to one end of the feedback resistor $R_F$ corresponding to impedance 400 of Fig. 1. The other end of resistor $R_F$ is connected to the input circuit of amplifier 201.

The operation of the specific arrangement of Fig. 2 as well as several basic features of the invention will now be discussed with reference to Figs. 2A and 2B.

Figure 2A:
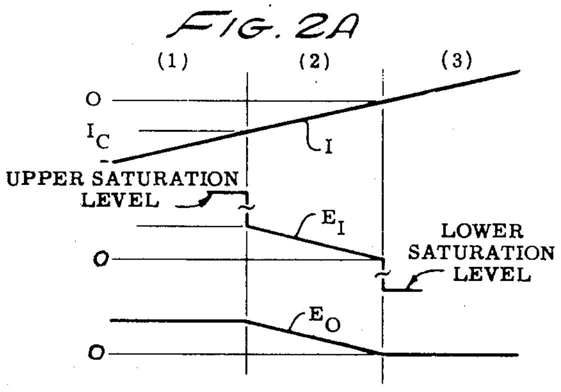
Fig. 2A is a composite set of wave forms illustrating the operation of the embodiment of Fig. 2.

In order to illustrate the three possible conditions of operation for the circuit of Fig. 2 the input signal I in Fig. 2A is assumed to vary from minus to positive levels. The starting minus level is less than a predetermined input value $I_C$. During condition 2 signal I is above $I_C$ but still below ground or zero volts then, in condition 3 signal I becomes positive.

When signal I is below level $I_C$ the output signal $E_I$ of amplifier 201 is at its upper saturation level. This is a matter of definition since the level $I_C$ is assumed to be that level below which amplifier 201 is driven into its upper saturation region. It is also assumed that this saturation region is selected to be substantially above voltage $E_O$.

This results in input diode $D_1$ being cut off so that voltage $E_O$ is determined by the division of source voltage V through load impedance $R_L$, diode $D_2$, and feedback impedance $R_F$.

As input signal I approaches the level $I_C$ signal $E_I$ at the output circuit of amplifier 201 falls and approaches the level of signal $E_O$.

A sharp transition then occurs as soon as input signal I rises above the level $I_C$ since this causes a sudden forward biasing of diode $D_1$ closing the feedback loop for amplifier 201. As signal I then rises toward ground or zero volts signal $E_I$ falls and signal $E_O$ follows signal $E_I$ with a slight voltage difference therebetween corresponding to the drop across diodes $D_1$ and $D_2$. The relationship between input signal I and output signal $E_O$, however, is independent of diodes $D_1$ and $D_2$ and is determined by the following $I/R_I=E_O/R_F$.

The reason for this relationship is that once the feedback loop is closed the input voltage appearing at the input circuits of amplifier 201 is at a virtual ground and it can be shown according to fundamental feedback theory that where the gain of the amplifier is high the current through input impedance $R_I$ is substantially equal to the current in the opposite direction through feedback impedance $R_F$. That is, the amplifier draws substantially no current.

When input signal I rises above ground or zero volts the output signal of amplifier 201 falls below ground which is passed on through diode $D_1$ to cause diode $D_2$ to be cut off. This then drives amplifier 201 to its lower saturation level since the feedback loop is again opened but this time the input signal applied to the amplifier is positive. In this condition of operation signal $E_O$ is effectively floating but may be assumed to be zero volts if the input circuit of amplifier 201 is so stabilized in the conventional manner.

In reviewing Fig. 2B then it is evident that the simple arrangement of Fig. 2 provides a three-condition type of operation for the circuit. Under condition 1, diode $D_1$ is cut off and diode $D_2$ is conducting causing output signal $E_O$ to assume a steady state high level determined by the voltage division between resistors $R_L$ and $R_F$. In this case, the only diode having any effect is diode $D_2$, and the effect is minor due to the fact that the voltage drop thereacross is small compared to the voltage V. During condition 2 then both diodes $D_1$ and $D_2$ are conducting and output signal $E_O$ is stabilized according to the function specified above which is completely independent of these diodes. Under condition 3 only diode $D_1$ conducts and the output signal is again independent of the diodes being established as a function of the voltage appearing at the input circuit of amplifier 201.

From the discussion thus far it should now be apparent that the invention provides an effective means of achieving high accuracy in a function generating circuit where predetermined initial and final levels are to be established in terms of an input signal which may vary therebetween. A similar effect may, of course, be obtained from the use of a diode circuit such as shown in Fig. 3 where diodes $D_1$ and $D_2$ are reversed with respect to their showing in Fig. 2. In this case the voltage which is applied to load resistor $R_L$ is designated as −V and the pertinent operating conditions are shown in Fig. 3A to be similar to those of Fig. 2B with the reversal of the inequality signs. Another set of wave forms similar to Fig. 2A is not shown since these should be apparent from the previous example and will simply show the inverse situation where input signal I declines from a predetermined level above the level $I_C$ and is above zero until the end of condition-period 2 at which time the signal falls below ground.

Figures 4, 4A:
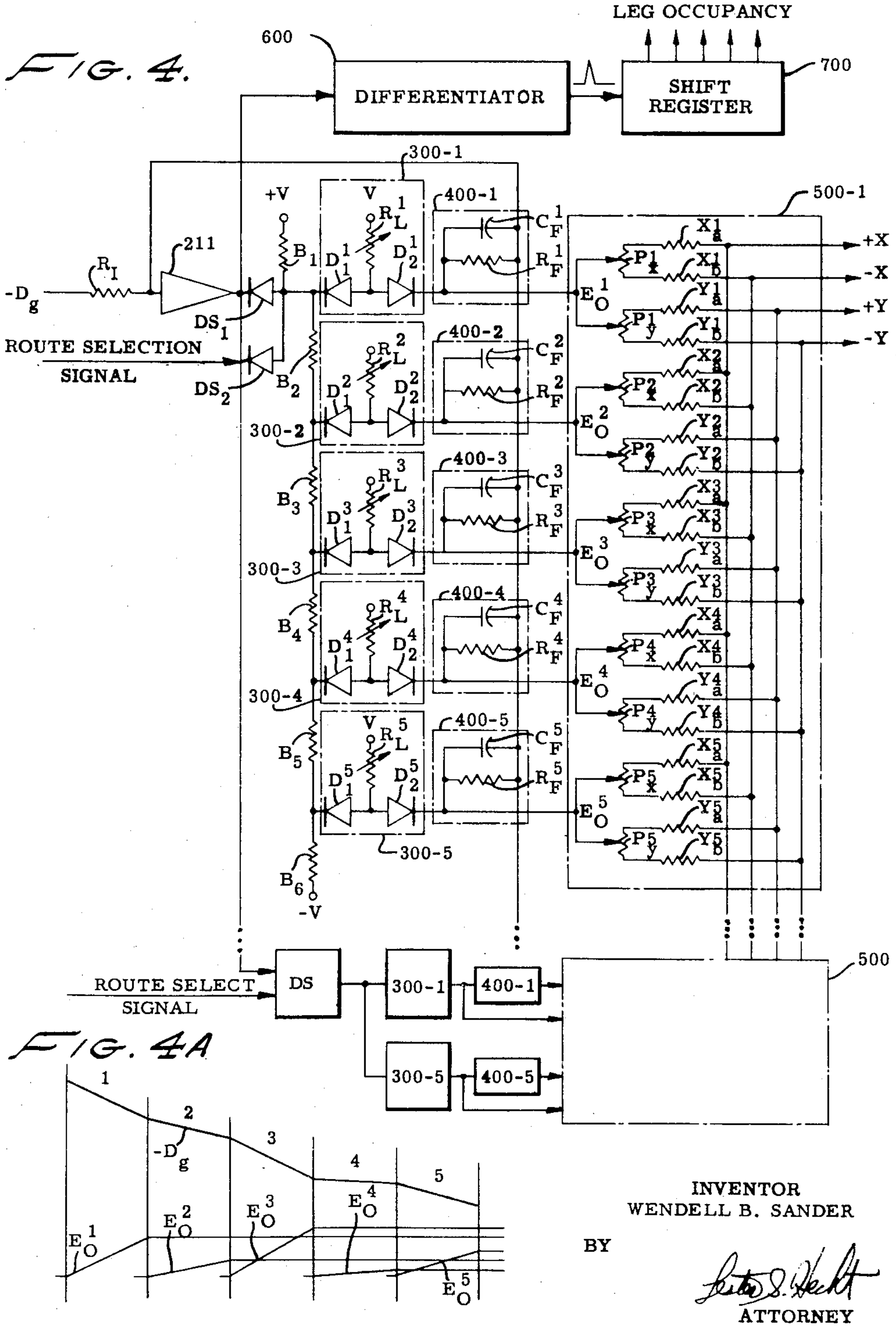
Fig. 4 is a schematic diagram of a system incorporating the invention for producing route coordinate signals.
Fig. 4A is a composite set of wave forms illustrating a typical operation of the system of Fig. 4.

Another important feature of the technique of the invention is the adaptability for use in deriving a plurality of independent output signals each of which is a respective individual function of a predetermined segment or portion of the input signal. This possibility will be discussed with reference to Figs. 4 and 4A. In Fig. 4 a schematic diagram of a route coordinate generator system is shown and in Fig. 4A a composite set of wave forms are shown to illustrate a typical operation.

Referring now to Fig. 4 it will be noted that the inverse of distance-to-go signal referenced therein as $-Dg$ is applied to input resistor $R_I$. The other end of resistor $R_I$ is coupled to the input circuit of amplifier 211 as previously noted. The output circuit of amplifier 211 is coupled to the cathode of the first switching diode $DS_1$. The anode of this diode is coupled to the anode of the second switching diode $DS_2$ which receives a route selection signal applied to the cathode thereof. The junction of the anodes of diodes $DS_1$ and $DS_2$ are coupled to a first bias resistor $B_1$ which receives a suitable source potential at its other end referred to as +V. The route selection signal is a positive-going pulse which is operative to cut off diode $DS_2$ permitting diode $DS_1$ to conduct and to transmit signal $E_I$ as discussed above.

A bias network consisting of additional resistors $B_2$, $B_3$, $B_4$, $B_5$, and $B_6$ is provided in order to bias each of diodes $D_1^1$, $D_1^2$, $D_1^3$, $D_1^4$, and $D_1^5$, at a different potential selected to provide different switching points for each of the respective diode networks. This will be discussed further below with reference to Fig. 4A.

Separate diode network load resistors $R_L^1$ through $R_L^5$ are provided and are coupled in the same manner as discussed above to the anodes of respective diodes $D_2^1$ through $D_2^5$ in diode networks 300–1 through 300–5, respectively. Each diode network is coupled to a feedback impedance consisting of a feedback resistor $R_F$ coupled and parallel to a bypass capacitor $C_F$. Thus feedback impedances 400–1 through 400–5 comprise the parallel combination of resistors $R_F^1$ through $R_F^5$ coupled to capacitors $C_F^1$ through $C_F^5$, respectively.

Signals $E_O^1$ through $E_O^5$ are inversely representative of corresponding segments of signal $-Dg$. The period during which each signal represents its respective segment being designated by the same number as the superscript of the output signal. That is, $E_O^1$ corresponds to the inverse of signal $-Dg$ during period 1 and signal $E_O^5$ corresponds to the inverse of signal $-Dg$ during period 5. Each of signals $E_O^1$ through $E_O^5$ is then translated through a respective output network into X and Y coordinate signals which are combined to produce total output signals referenced as +X, −X, +Y, and −Y.

Since each of the output networks is arranged in a similar manner to provide the desired translation function only one network will be described, namely that for translating signal $E_O^1$ into the appropriate output signals. It will be noted that signal $E_O^1$ is applied to a potentiometer $P_X^1$ one end of which is coupled to a resistor $X_A^1$ providing an output signal forming part of total signal +X. The other end of potentiometer $P_X^1$ is coupled to resistor $X_B^1$, the other end of which provides a signal which is combined with other similar signals to generate output signal −X. In a similar manner signal $E_O^1$ is also applied to the variable tap of potentiometer $P_Y^1$ one end of which is coupled to a resistor $Y_A^1$ which provides a signal combined to form output signal +Y and the other end of potentiometer $P_Y^1$ is coupled to an output resistor $Y_B^1$ the other end of which produces a signal combined to form output signal −Y.

The position for the movable element of each of potentiometers $P_X^1$ through $P_X^5$ and $P_Y^1$ through $P_Y^5$ is selected to provide the desired linear translation from the applied input signal $E_O$ to the output signal which corresponds to the X or Y coordinate for the particular leg segment. Thus, in this manner, as signal $-Dg$ varies throughout its range of values signals $E_O$ are produced corresponding to various segments thereof and are translated respectively according to functions corresponding to the X and Y coordinates of the particular segment where these are combined by linear addition through respective output resistor $X_A^1$ through $X_A^5$, $X_D^1$ through $X_D^5$, $Y_A^1$ through $Y_A^5$, and $Y_B^1$ through $Y_B^5$.

The same type of translation may be performed for a number of different routes each of the translations being performed through a network similar to that just described which receives an appropriate route selection signal through a diode similar to diode $DS_2$.

Each of the output signals $E_O^1$ through $E_O^5$ is applied as explained above through its respective feedback impedance to the input circuit of high-gain amplifier 201. The operation of the feedback loop and high-gain amplifier insures that the output signals are stabilized according to the following relationship:

$$-Dg/R_I=E_O^1/R_F^1+E_O^2/R_F^2+E_O^3/R_F^3+E_O^4/R_F^4+E_O^5/R_F^5$$

This relationship insures, in a manner similar to that discussed above, that the output signals are produced independently of any drift inherent of the diodes employed in the circuit 300.

An additional feature of the arrangement of Fig. 4 is that a differentiator 600 is coupled to the output circuit of amplifier 201 and is sensitive, as an illustration, to positive changes in the voltage level thereof to produce a pulse for actuating a shift register 700. Each stage of shift register 700 when "on" represents a different leg occupancy since the sharp positive changes at the output circuit of amplifier 201 occur at the transition from one leg to the next. In lieu of shaft register 700 a counter may be employed, the output cathode of which would then represent the number of legs which had previously been passed in the operation. This count could be translated into leg occupancy signals if desired.

From the foregoing description it should now be apparent that the present invention provides an improved function generator circuit for translating an input signal into an output signal according to a predetermined translation function where the output signal amplitude is substantially insensitive to characteristic changes in elements employed therein such as diodes and the like.

It has been shown further that the basic circuit of the invention is well adapted for incorporation into a system of the type shown in Fig. 4 wherein a plurality of diode networks are interconnected to provide a corresponding plurality of separate output signals each of which is individually related to the input signal according to its own respective translation function.

While only two specific diode circuit arrangements have been described it will be understood that many other variations are possible utilizing other types of elements without departing from the spirit of the present invention.

An additional feature provided by the technique described herein is the fact that the signal amplitudes produced have sharp transition points which may be detected as illustrated in Fig. 4 through a differentiator in order to designate certain intervals of an input signal such as signal $-Dg$. The ability to produce output signals having sharp amplitude changes at predetermined levels may be useful with many other applications such as, for example, in quantizing circuits of the type mentioned above for use in pulse code modulation.

It is expected, in the development of this art, that many other variations will appear to those skilled in the art and that many other important applications will arrive. Accordingly the scope of the present invention is commensurate with any use of the basic feedback principle described herein as covered by the appended claims.

I claim:

1. A function generator comprising: a diode network having first, second, and third terminals; a high-gain amplifier having an output circuit coupled to said first terminal and an input circuit; an input impedance having one end for receiving an input signal and a second end coupled to the input circuit of said amplifier; a feedback impedance coupled between said second terminal and the input circuit of said amplifier; and means for applying a source signal to the third terminal of said diode network, said network being arranged and said source signal being selected to permit operation of said function generator in either of three conditions, the first of which occurs when the output circuits of the amplifier are disconnected electrically from said diode network, the second which occurs when said second terminal is disconnected from said feedback impedance and the third of which occurs when both of said first and second terminals are connected to the associated circuits.

2. The combination comprising: an operational amplifier network including an input impedance having an input end for receiving an input signal and an output end, a high-gain amplifier having an input circuit coupled to the output end of said input impedance and having an output circuit, and a feedback impedance having one end coupled to the input circuit of said amplifier and having a second end; a network including first and second unilateral devices coupled together and including a load impedance element coupled to the junction of said unilateral devices, said first unilateral device being coupled to the output circuit of said amplifier and said second unilateral device being coupled to said feedback impedance; and means for biasing said unilateral devices to permit a three-condition operation corresponding to the conditions of conduction in said unilateral device—both conducting, or said first or said second unilateral devices conducting separately.

3. The combination defined in claim 2 wherein the input signal applied to said amplifier is referred to as I, the output signal produced by said amplifier is referred to as $E_I$, the output signal produced by the said network is referred to as signal $E_O$ and wherein said first and second unilateral devices are referred to as devices $D_1$ and $D_2$, respectively, said three conditions of operation being definable by the following:

| (1) | (2) | (3) |
|---|---|---|
| $I<I_C$<br>$E_I>E_O$<br>$D_1$ is Off<br>$D_2$ is On | $I_C=I<O$<br>$E_O>E_I>O$<br>$D_1$ is On<br>$D_2$ is On | $I<O$<br>$E_I<O$<br>$D_1$ is On<br>$D_2$ is Off |

where $I_C$ represents an amount of input current which is sufficiently large to cause the output signal produced by said amplifier to fall below the level of output signal $E_O$.

4. The combination defined in claim 2 wherein the input signal applied to said amplifier is referred to as I, the output signal produced by said amplifier is referred to as $E_I$, the output signal produced by the said network is referred to as signal $E_O$ and wherein said first and second unilateral devices are referred to as devices $D_1$ and $D_2$, respectively, said three conditions of operation being definable by the following:

| (1) | (2) | (3) |
|---|---|---|
| $I>I_C$<br>$E_I<E_O$<br>$D_1$ is Off<br>$D_2$ is On | $O<I<I_C$<br>$O>E_I>E_O$<br>$D_1$ is On<br>$D_2$ is On | $I<O$<br>$E_I>O$<br>$D_1$ is On<br>$D_2$ is Off |

where $I_C$ represents an amount of input current which is sufficiently large to cause the output signal produced by said amplifier to fall below the level of output signal $E_O$.

5. A device for translating an input signal into a plurality of output signals which individually correspond to the input signal according to respective translation functions, said device comprising: an input impedance having a first end for receiving the input signal; a high-gain amplifier having an input circuit coupled to the other end of said input impedance and having an output circuit; a plurality of diode function generators having respective input terminals coupled to the output circuits of said amplifier; a plurality of feedback impedances associated with said diode circuits, respectively, each feedback impedance coupling the output terminal of the associated diode circuit to the input circuit of said amplifier; and a plurality of output circuits coupled respectively to the output terminals of said diode circuits, each output circuit being arranged to translate the electrical signal produced by the respective diode circuit into an output signal according to a respective predetermined translation function, each of said diode circuits being arranged to produce its output signal to correspond to a predetermined segment of said input signal in accordance with said translation function.

6. A multiple function generator comprising: a plurality of step-function generating networks, each of said networks including an input terminal, an output terminal, and a source terminal; a bias network coupling said input terminals for providing separate biases for each of said step-function networks to determine at least one point in said step function; the high-gain amplifier having an output circuit coupled to said bias network and having an input circuit; an input impedance coupled to said high-gain amplifier for receiving an input signal to be translated into a plurality of functions; a plurality of feedback impedances coupling said output terminals respectively to the input circuit of said high-gain amplifier; and a plurality of output impedances coupled respectively to said output terminal for deriving output signals constituting predetermined functions of predetermined portions of the input signal, the portions being determined by the level of the source applied to the associated third terminal of the step-function network, the level of the bias signal applied to first terminal of the particular network, and the relative values of the particular feedback impedance and said input impedance.

7. An output circuit for a high gain amplifier adapted to receive an input signal and to produce an output signal functionally related thereto, the amplifier having input and output terminals and having a feedback impedance coupled at one end to the input terminal thereof, the feedback impedance being adapted to transfer degenerative signals from the amplifier output terminal to the amplifier input terminal, said output circuit comprising: a two terminal circuit having input and output terminals, said input terminal of said output circuit being coupled to the amplifier output terminal, and said output terminal of said output circuit being coupled to the other end of said feedback impedance; said output circuit being operable to produce a first fixed output signal when the amplifier input signal is below a first reference level, said output circuit being operable to produce a second fixed output signal when the amplifier input signal is above a second reference level, and said output circuit being operable to produce a variable output signal when the amplifier input is between said first and second reference levels; the magnitude of said first and second fixed output signals being substantially independent of variations in the amplifier input signal, and the magnitude of said variable signal output being responsive to variations in the amplifier input signal.

8. An output limiting circuit for a high gain amplifier having input and output terminals and having feedback impedance coupled at one end to the input terminal thereof, the feedback impedance being adapted to couple degenerative feedback signals from the amplifier output to the amplifier input, said output limiting circuit comprising: a two terminal switching circuit having input and output terminals, said input terminal of said switching circuit being coupled to the amplifier output terminal, and said output terminal of said switching circuit being coupled to the other end of the feedback impedance; said switching circuit including a fixed signal source therein; said switching circuit being operable to couple the output terminal thereof to the amplifier output terminal when an input signal whose magnitude falls within predetermined upper and lower limits is applied to the amplifier input terminal, said switching circuit being operable to uncouple said output terminal thereof from the amplifier output terminal and to couple the output terminal thereof to said fixed signal source when an input signal smaller than said lower limit is applied to the amplifier input terminal, and said switching circuit being operable to uncouple the output terminal thereof from the amplifier output terminal and from said fixed signal source when a signal greater than said upper limit is applied to the amplifier input terminal.

9. An output limiting circuit for a high gain amplifier having input and output terminals and having a feedback impedance coupled at one end to the input terminal thereof, the feedback impedance being adapted to couple degenerative feedback signals from the amplifier output to the amplifier input, said output limiting circuit comprising: a two terminal unilateral device having one terminal thereof coupled to the amplifier output terminal and the other terminal thereof coupled to a corresponding terminal of a second two terminal unilateral device, the other terminal of said second unilateral device being coupled to the other end of said feedback impedance, a load impedance coupled to both unilateral devices at the common terminals thereof, and a voltage source coupled to the other end of said load impedance; said output limiting circuit being adapted to turn said first unilateral device "on" when an input signal greater than a first reference level is applied to the amplifier input terminal, said output limiting circuit being adapted to turn said second unilateral device "on" when an input signal smaller than a second reference level is applied to the amplifier input terminal, and said second reference level being greater than said first reference level.

10. An output circuit for a high gain amplifier having input and output terminals and having a feedback network coupled at one end to the input terminal thereof, the feedback network being adapted to couple degenerative feedback signals from the amplifier output to the amplifier input, and the feedback network having a plurality of feedback terminals at the other end thereof, said output circuit comprising: a plurality of output limiting circuits as defined in claim 9 each having one unilateral device coupled to the amplifier output terminal and the other unilateral device coupled to a corresponding feedback terminal; and a summing circuit coupled to each of said plurality of feedback terminals, said summing circuit being operable to produce an output signal equal to the sum of the signal levels at the individual feedback terminals of said feedback network.

References Cited in the file of this patent

UNITED STATES PATENTS

| | | |
|---|---|---|
| 2,412,227 | Och et al. | Dec. 10, 1946 |
| 2,618,753 | Van Meirlo | Nov. 18, 1952 |
| 2,899,550 | Meissenger et al. | Aug. 11, 1959 |
| 2,924,711 | Kretzmer | Feb. 9, 1960 |

FOREIGN PATENTS

| | | |
|---|---|---|
| 765,825 | Great Britain | Jan. 16, 1957 |

OTHER REFERENCES

"Junction Transistor Circuit Applications," by P. G. Sulzer, page 170, Electronics, August 1953.